US00RE45655E

(19) United States
(12) Reissued Patent
Kolar et al.

(10) Patent Number: US RE45,655 E
(45) **Date of Reissued Patent: *Aug. 18, 2015**

(54) SEALING ENCLOSURE FOR A BLENDER

(71) Applicants: David J Kolar, Stow, OH (US); Stephen P. Rukavina, Rocky River, OH (US)

(72) Inventors: David J Kolar, Stow, OH (US); Stephen P. Rukavina, Rocky River, OH (US)

(73) Assignee: Vita-Mix Corporation, Olmsted Township, OH (US)

( * ) Notice: This patent is subject to a terminal disclaimer.

(21) Appl. No.: 13/893,531

(22) Filed: May 14, 2013

Related U.S. Patent Documents

Reissue of:
(64) Patent No.: 8,087,603
Issued: Jan. 3, 2012
Appl. No.: 12/460,592
Filed: Jul. 22, 2009

U.S. Applications:
(60) Provisional application No. 61/189,172, filed on Aug. 15, 2008, provisional application No. 61/209,063, filed on Mar. 2, 2009.

(51) Int. Cl.
*A47J 43/046* (2006.01)

(52) U.S. Cl.
CPC ..... *A47J 43/046* (2013.01)

(58) Field of Classification Search
CPC ..... A47J 43/046
USPC ..... 241/285.3, 282.1, 282.2; 366/347; 181/198
See application file for complete search history.

(56) References Cited

U.S. PATENT DOCUMENTS

| | | | | |
|---|---|---|---|---|
| 3,175,594 | A * | 3/1965 | Jepson et al. | 241/199.12 |
| D237,503 | S | 11/1975 | Langmack, Jr. et al. | D26/5 R |
| D249,870 | S | 10/1978 | Tillander | D9/224 |
| D295,012 | S | 4/1988 | Gelber | D7/378 |
| 4,822,175 | A | 4/1989 | Barnard et al. | 366/347 |
| D301,824 | S | 6/1989 | Machuron | D7/384 |
| 4,883,144 | A | 11/1989 | Haushalter et al. | 181/198 |
| D321,647 | S | 11/1991 | Oldorf | D9/432 X |
| 5,533,797 | A | 7/1996 | Gelber | 312/138.1 |
| D406,154 | S | 2/1999 | Copland et al. | D15/82 |
| 5,957,577 | A | 9/1999 | Dickson et al. | 366/197 |
| D426,423 | S | 6/2000 | Lee | D7/384 |

(Continued)

FOREIGN PATENT DOCUMENTS

WO WO 2005/051149 9/2005

OTHER PUBLICATIONS

PCT International Preliminary Report and Written Opinion (7 pages—dated Feb. 24, 2011).

(Continued)

*Primary Examiner* — Mark Rosenbaum
(74) *Attorney, Agent, or Firm* — McDonald Hopkins LLC

(57) ABSTRACT

An enclosure for a blender including a body portion adapted to be secured to a base, and a cover pivotally attached to the body portion. The body portion includes sidewalls, a back wall, and an abbreviated top wall. The cover includes sidewalls, a front wall, a top wall, and an abbreviated back wall. A flange extends outwardly from the sidewalls and the top wall of the body portion and a gasket is provided thereon to create a seal between the cover and the body portion of the enclosure.

20 Claims, 9 Drawing Sheets

(56) References Cited

U.S. PATENT DOCUMENTS

| | | | | |
|---|---|---|---|---|
| D427,016 | S | 6/2000 | Kindig et al. | D7/412 |
| D428,564 | S | 7/2000 | Kao | D7/374 |
| D432,864 | S | 10/2000 | Kindig et al. | D7/412 |
| D466,761 | S | 12/2002 | Baerenrodt et al. | D7/378 |
| D471,059 | S | 3/2003 | Chuang | D7/374 |
| 6,571,908 | B2 | 6/2003 | Bohannon et al. | 181/198 |
| D526,845 | S * | 8/2006 | Katz et al. | D7/412 |
| D528,364 | S | 9/2006 | Kolar et al. | D7/413 |
| 8,287,180 | B2 * | 10/2012 | Kolar et al. | 366/347 |
| 2003/0034200 | A1 | 2/2003 | Bohannon et al. | 181/202 |

OTHER PUBLICATIONS

Q Series—Blendtec (May 2006—2 pages).

Xtreme—Waring (2006—2 pages).

Blendtec Operations Manual—Blendtec (Apr. 2006—15 sheets).

Summit Operation Manual—Hamilton Beach (Nov. 2007—pp. 1, 4, 6, 7, 8.

PCT International Search Report (9 pages—Oct. 26, 2009).

* cited by examiner

SEALING ENCLOSURE FOR A BLENDER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority from U.S. Provisional Application No. 61/189,172 filed Aug. 15, 2008, and U.S. Provisional Application No. 61/209,063 filed Mar. 2, 2009, both of which are incorporated herein by reference.

TECHNICAL FIELD

This invention relates to an enclosure such as those which house a food processor to deaden the noise emanating therefrom. More particularly, this invention relates to such an enclosure having a main body and a cover, wherein the cover is hinged to the main body and an elastomeric seal is provided on the main body to create a sound reducing seal between the main body and the cover.

BACKGROUND ART

A common problem associated with electric food processors, or blenders, is the noise generated when the food processor is running. The amount of noise generated by these devices is a result of both the blending taking place within the container of the blender, often involving the crushing of ice, as well as the noise vibrations that are generated by the electric motor of the blender. The noise levels generated by the food processor are particularly troublesome in commercial settings such as restaurants, food stands, and coffee shops, especially where the food processor is positioned near a customer service counter.

Enclosures are often provided for food processors to isolate the container and reduce the noise levels during operation. Such enclosures are well known in the art such as that shown, for example, in U.S. Pat. No. D427,016. These enclosures are designed to muffle the noise of the food processor during operation. Most enclosures are formed of two components, that is, a main body and a cover. The cover is usually hingedly attached to the main body of the enclosure which is attached to the base of the blender. The main body of the enclosure may secured to the base by a number of methods known in the art, such as, for example, by tongue and groove attachment, mechanical fasteners, or by magnetic means such as that disclosed in U.S. Provisional Patent Application No. 61/135,480. The base includes an electric motor and a control module which allows a user to start, stop, and adjust the speed of the food processor. When the container of the blender is positioned on the base, it may be accessed by pivoting the enclosure cover relative to its main body.

In many cases, conventional enclosures provide less than desired results in suppressing the noise levels of the food processor. The underperformance of the enclosure can be contributed at least, in part, to an ineffective seal between the main body and the cover of the enclosure. The lack of an effective seal allows noise to escape the enclosure, while also allowing the cover to vibrate against the main body, potentially creating an additional source of noise. These vibrations are transferred from the electric motor in the base member of the food processor to the base member, and then to the main body of the enclosure.

Thus, the need exists for a food processor having an enclosure which is effective at significantly reducing noise levels created by operation of the food processor.

DISCLOSURE OF THE INVENTION

It is thus an object of one aspect of the present invention to provide an enclosure for a food processor that reduces the noise level of the food processor during operation.

It is an object of another aspect of the present invention to provide an enclosure, as above, that provides a seal between the body portion and the pivoting cover of the enclosure.

These and other objects of the present invention, as well as the advantages thereof over existing prior art forms, which will become apparent from the description to follow, are accomplished by the improvements hereinafter described and claimed.

In general, an enclosure for a food processor according to the concepts of the present invention includes a body portion adapted to be secured to a base of the food processor and a cover pivotally secured to the body portion and movable between an open position and a closed position. A gasket is positioned between the cover and the body portion when the cover is in the closed position.

In accordance with at least one aspect of the present invention, an enclosure for a food processor includes a body portion adapted to be secured to a base of the food processor and a cover pivotally secured to the the body portion and movable between an open position and a closed position. The body portion includes opposed sidewalls, a rear wall extending between the sidewalls, and a top wall. A sealing gasket covers a portion of the sidewalls and the top wall of the body portion and is positioned between the body portion and the cover when the cover is in the closed position.

In accordance with at least one aspect of the present invention, an enclosure for a food processor includes a body portion adapted to be secured to a base of the food processor, the body portion having an outwardly extending flange. A cover is also provided and is pivotally secured to the body portion and is movable between an open position and a closed position. The cover has an inwardly extending flange. A gasket is positioned on the outwardly extending flange or the inwardly extending flange and is between and in contact with both the outwardly extending flange and the inwardly extending flange when the cover is in the closed position.

A preferred exemplary enclosure for a food processor according to the concepts of the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
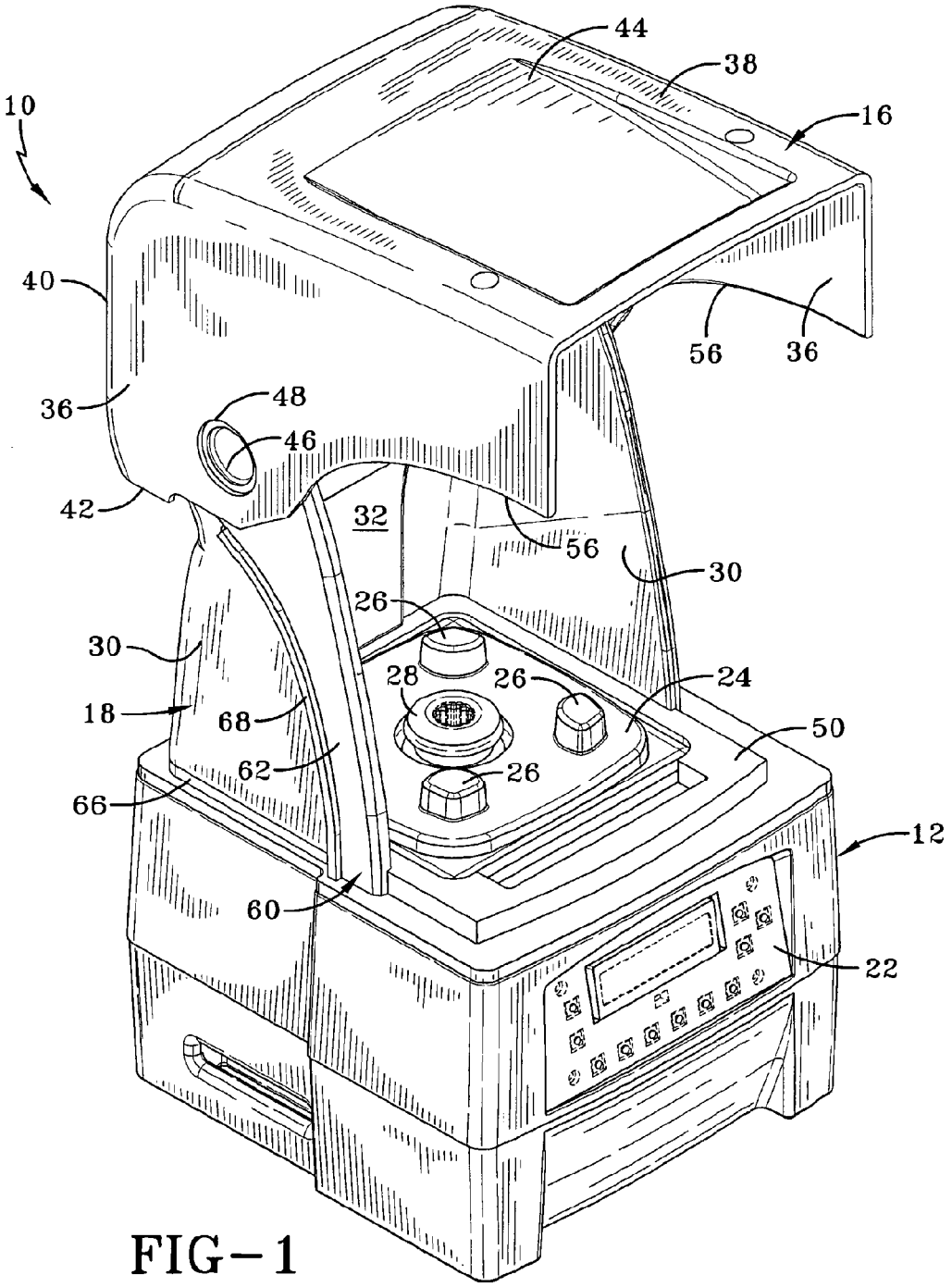
FIG. 1 is a perspective view of a food processor and enclosure according to one embodiment of the present invention showing the enclosure in an open position.
Figure 2:
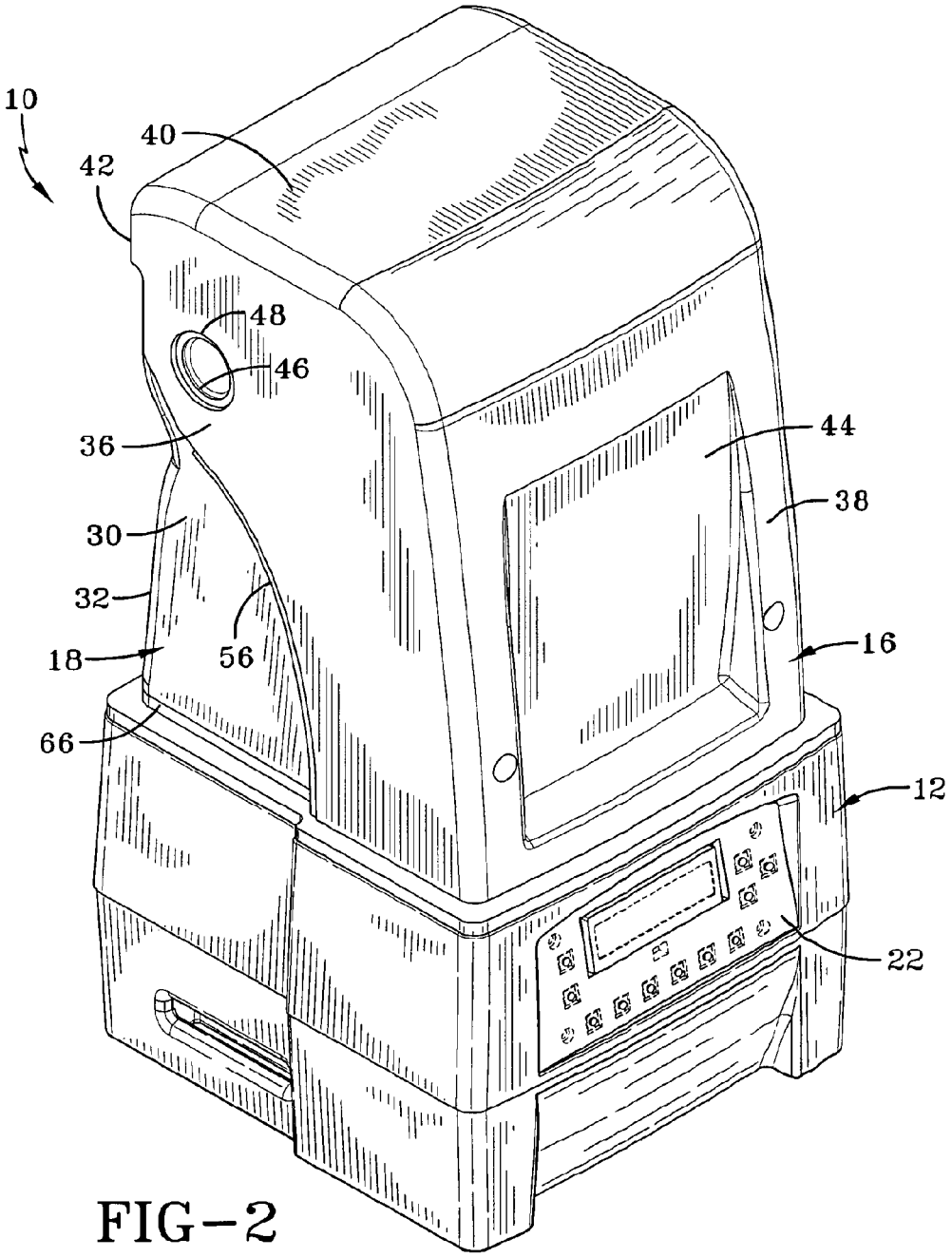
FIG. 2 is a perspective view of the food processor of FIG. 1 with the enclosure closed.
Figure 3:
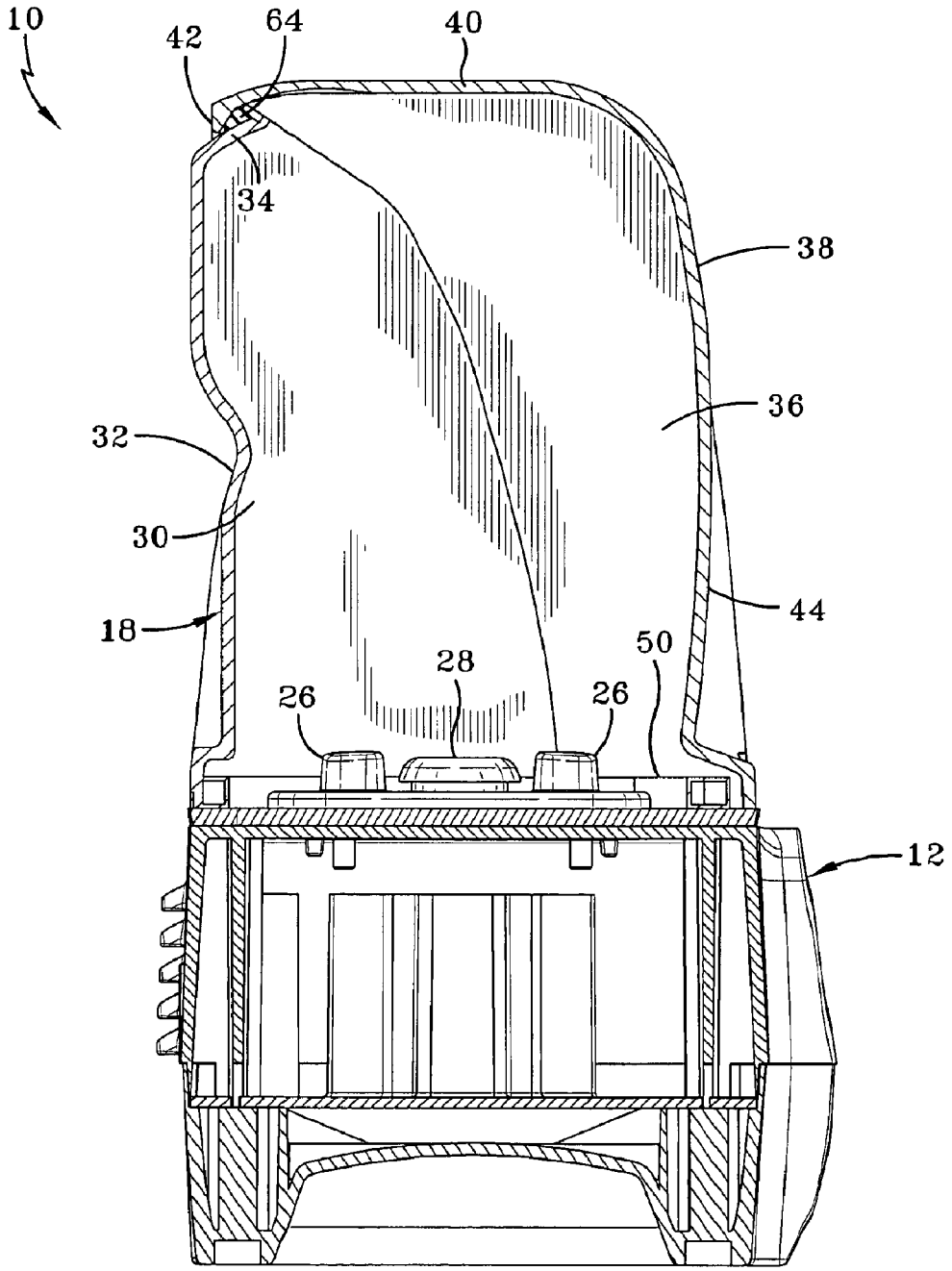
FIG. 3 is a section view of the food processor and enclosure of FIG. 1.

One embodiment of an enclosure for a food processor made in accordance with the present invention is shown in FIGS. 1-6 and is indicated generally by the numeral 10. The food processor includes a base member, generally indicated by the numeral 12, which houses a motor to operate the blender. Enclosure 10 includes a cover 16 and a body portion 18 that is designed to be attached to base member 12. The food processor further includes a container (not shown), which has a set of rotating blades therein, and which is used to contain and mix ingredients. As such, the container of the food processor is positioned on the base member 12 and housed within enclosure 10 during blending to muffle the noise generated by operation of the blender.

Base member 12 often includes a control panel 22 on one of its surfaces where the blender can be turned on and off, and the speed of rotation of the motor can be adjusted. An opening (not shown) may also be provided in base member 12 so that an electric cord can pass from within to provide power to the motor housed within base member 12. Base member 12 also includes a raised pedestal 24 on a top surface thereof, which is adapted to be received in a base portion of the container. Pedestal 24 may include one or more pads 26 which, when received by the base portion of the container, prevent the container from rotating when the motor within base member 12 is actuated. In addition, pedestal 24 also receives a splined end 28 of a rotating motor shaft therethrough. A splined drive shaft, which extends from the blender blades within the container, engages the splined end of the rotating motor shaft in base member 12. Rotation of the motor shaft caused by actuation of motor 14 is thereby transferred to the draft shaft and the blades rotatably positioned within the container, as is well known in the art.

Figure 5:
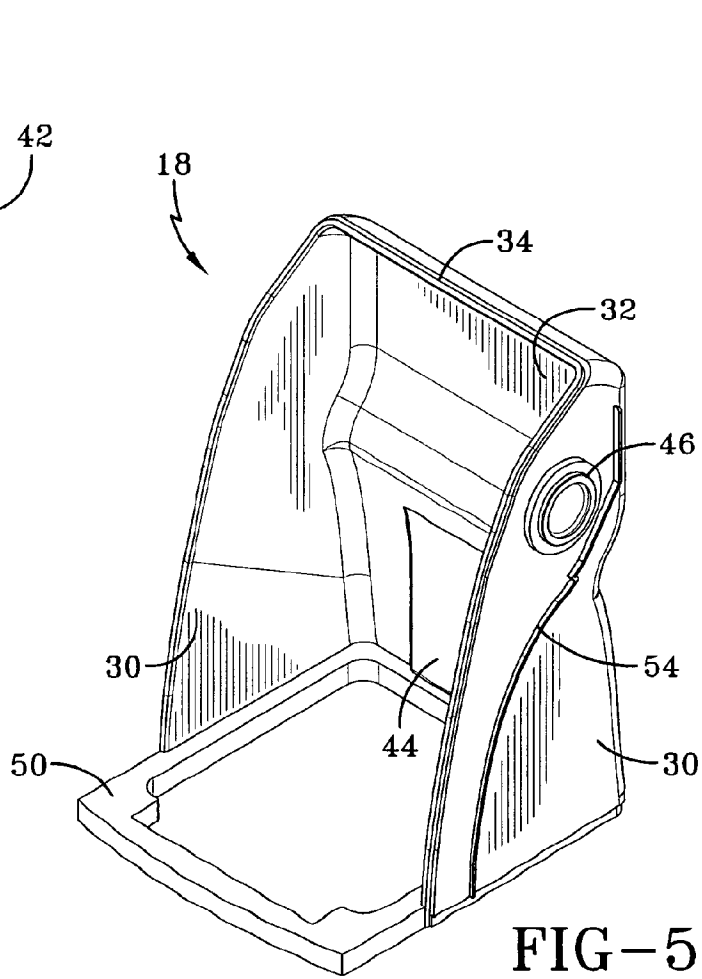
FIG. 5 is a perspective view of a body portion of the enclosure for the food processor shown in FIG. 1.
Figure 4:
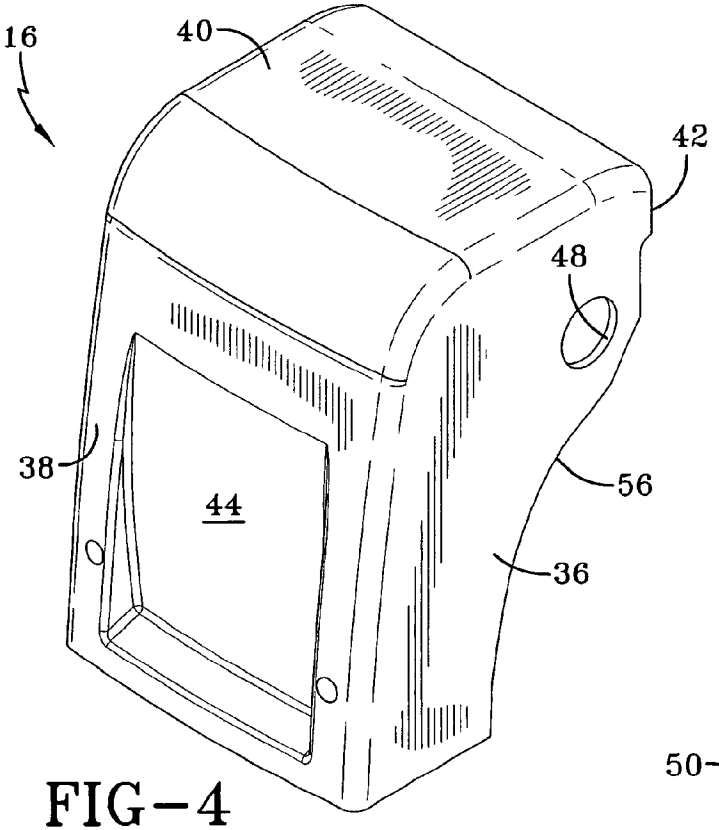
FIG. 4 is a perspective view of a cover of the enclosure for the food processor shown in FIG. 1.

Body portion 18 of enclosure 10 includes opposed sidewalls 30 spanned by a rear wall 32 and an abbreviated top wall 34 (FIG. 5). Body portion 18 has an open front area opposed to rear wall 32, which front area is closed by cover 16 to form enclosure 10. Cover 16 includes opposed sidewalls 36 spanned by a front wall 38, a top wall 40, and an abbreviated back wall 42. Cover sidewalls 36, front wall 38 and top wall 40 are sized and spaced laterally such that cover 16 may fit over an overlap body portion sidewalls 30.

Cover 16 and body portion 18 may be made of a clear thermoplastic material, such as polycarbonate or polyester, so that the container of the blender can be viewed when positioned on the base member 12 with cover 16 in a closed position. Alternatively, windows 44 may be provided in both cover 16 and body portion 18 to allow a container within enclosure 10 to be viewed.

Cover 16 may be pivotally connected to body portion 18 by any method known in the art, such that it can be moved from a closed position to an open position, allowing access to the interior of enclosure 10. As such, a hinge assembly may be formed by a pair of sockets 46 on sidewalls 30 of body portion 18 and a pair of corresponding apertures 48 in sidewalls 36 of cover 16. Apertures 48 are sized to fit over sockets 46. Thus, when sockets 46 are positioned within apertures 48, cover 16 is rendered pivotable with respect to body portion 18 on an axis defined by sockets 46.

Body portion 18 also includes a foot 50 at the bottom of sidewalls 30 and rear wall 32, foot 50 being adapted to secure enclosure 10 to the base member 12 of the food processor. Foot 50 may be secured to the base member 12 by any method known to persons skilled in the art, such as, for example, by tongue and groove attachment, with the use of fasteners including thumb screws, or by magnetic means. A vibration dampening seal may optionally be provided between foot 50 and base member 12 to reduce the vibrations transferred from base member 12 to enclosure 10, thereby further reducing the noise created by the food processor.

Each sidewall 30 of body portion 18 includes an outwardly extending projection 54 thereon (FIG. 5). Each projection 54 travels upward along the outer surface of sidewalls 30 and is configured to generally parallel a rear edge 56 of sidewalls 36 of cover 16. Thus, where the rear edges 56 of sidewalls 36 have a radiused shape, as in the embodiment shown in FIGS. 1-6, the projections 54 on sidewalls 36 also have a radiused shape. The mating shapes of rear edges 56 of sidewalls 36 and projections 54 ensure that rear edges 56 and projections 54 are in direct contact along the entire length of the projections.

Figure 6:
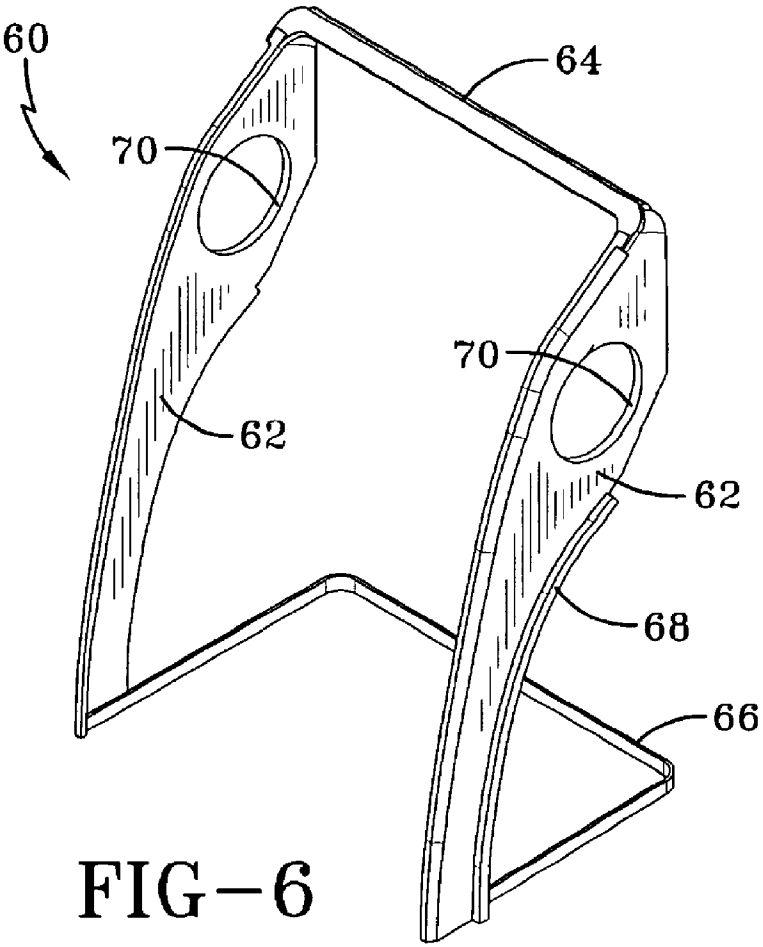
FIG. 6 is a perspective view of a gasket of the enclosure for the food processor shown in FIG. 1.
Figure 7:
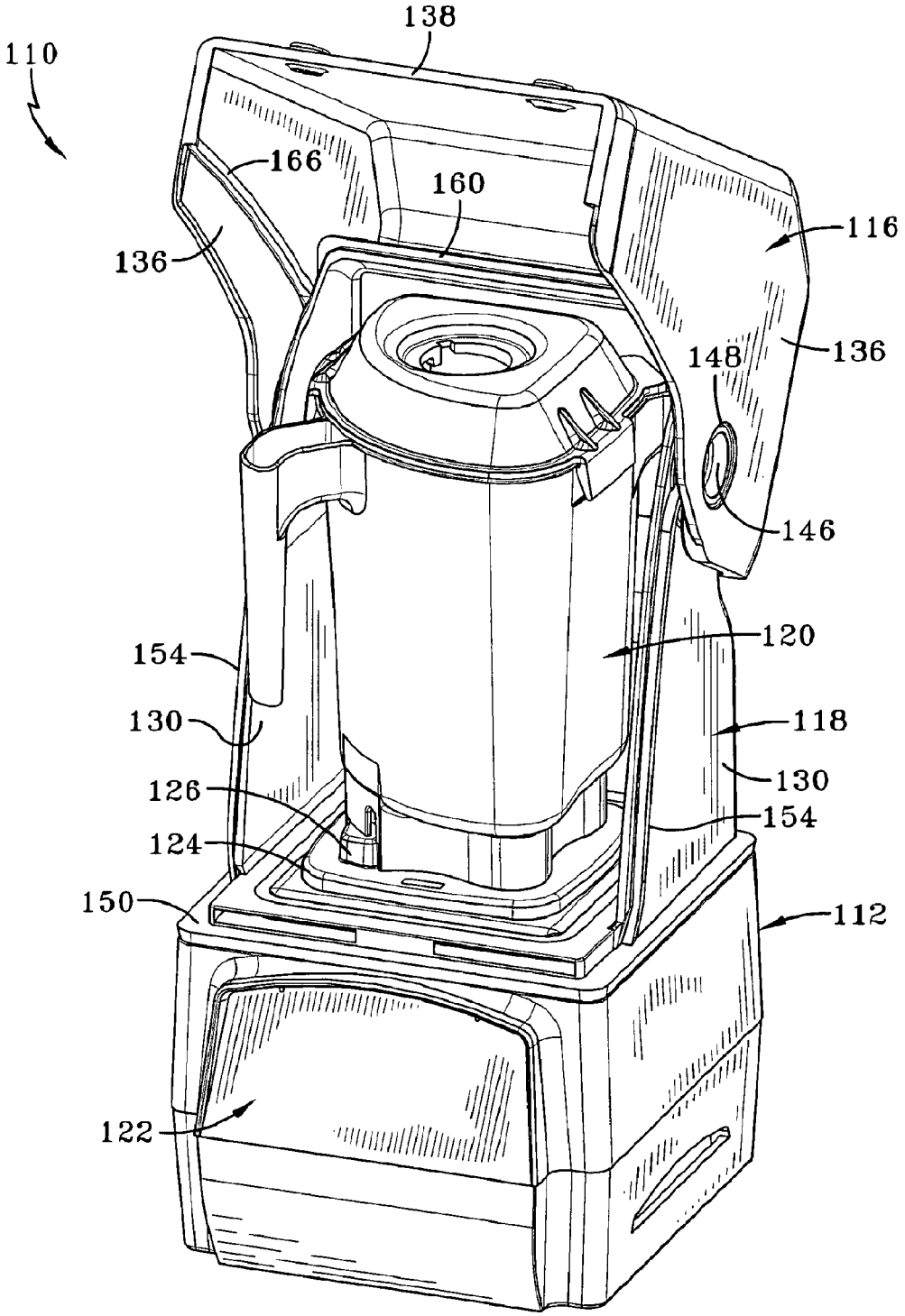
FIG. 7 is a perspective view of another embodiment of a food processor and enclosure according to the present invention showing the enclosure in an open position.

A gasket, generally indicated by the numeral 60 and best shown in FIG. 6, is fitted over a portion of body portion 18 of enclosure 10 to create a seal when cover 16 is in a closed position. Gasket 60 includes side portions 62, a top portion 64 extending between laterally spaced side portions 62, and may optionally include a bottom portion 66. Gasket 60 is a single integral piece that is molded to fit snuggly over body portion 18 and may be secured to body portion 18 by any method known to those skilled in the art, including, for example, by providing an adhesive between gasket 60 and body portion 18. Gasket 60 may be made of any material capable of providing a sound and vibration dampening seal against cover 16, such as, for example, a thermoplastic elastomer.

The side portion 62 of gasket 60 include a lip 68 extending outwardly therefrom, and having a shape identical to projections 54 extending from body portion 18. When gasket 60 is positioned on body portion 18, lip 68 abuts and is in contact with projection 54. Such helps to ensure proper positioning of gasket 60, and also provides a superior seal against back edge 56 of cover sidewalls 36, as will be hereinafter discussed. Side portion 62 of gasket 60 include aperture 70 sized and positioned to be aligned with apertures 48 and cover 16, and to allow sockets 46 to extend therethrough. Top portion 64 of gasket 60 extends across the exterior of abbreviated top wall 34 of body portion 18. Bottom portion 66 of gasket 60 extends around the outer, bottom edge of sidewalls 30 and rear wall 32.

Gasket 60 provides a sealing surface for cover 16 of enclosure 10. When cover 16 is in a closed position, the rear edges 56 of sidewalls 36 contact lip 68 of gasket 60, thereby creating a seal therebetween. In addition, the interior of sidewalls 36 are in contact with the side portions 62 of gasket 60, thereby providing an additional seal against noise generated within enclosure 10. Top portion 64 of gasket 60 is engaged by abbreviated back wall 42 of cover 16, providing a seal across the top of enclosure 10. A complete seal is thus provided for enclosure 10 when cover 16 is in a closed position inasmuch as no surface of cover 16 directly contacts body portion 18. This significantly reduces the amount of vibration transferred between body portion 18 and cover 16, and also provides a much improved sound barrier against noises created by the blending occurring within enclosure 10.

Another embodiment of an enclosure made in accordance with the present invention is shown in FIGS. 7-10 and is indicated generally by the numeral 110. Enclosure 110 is identical in most respects to enclosure 10 discussed above, and like components will therefore be numbered accordingly. The food processor includes a base member, generally indicated by the numeral 112, which houses a motor to operate the blender. Enclosure 110 includes a cover 116 and a body portion 1 18 that is adapted to be attached to base member 112. The food processor also includes a container 120, which has a set of rotating blades therein, and which is used to contain and mix ingredients. As such, the container 120 is positioned on the base member 112 during operation of the food processor and is housed within enclosure 110 to muffle the noise generated by the operation of the food processor.

Base member 112 is identical to base member 12 discussed above, and includes a control panel 122, a raised pedestal 124, and pads 126 on raised pedestal 124. A splined end of a rotating motor shaft extends through pedestal 124 and is adapted to engage a splined drive shaft extending from the blender blades within the container. Thus, rotation of the motor shaft is transferred to the drive shaft and the blades rotatably positioned within the container 120, as is well known in the art.

Figure 8:
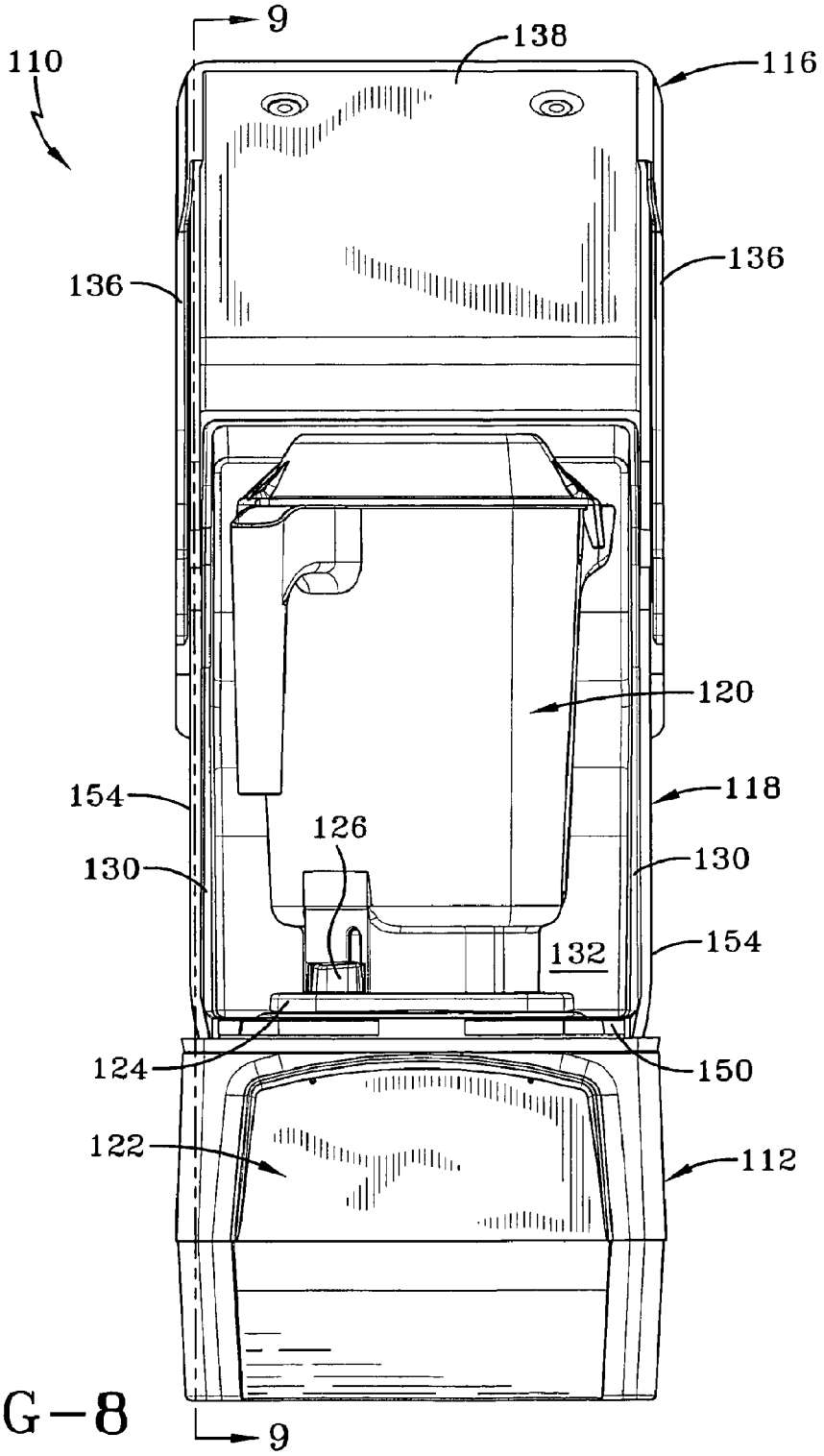
FIG. 8 is a front elevational view of the food processor enclosure of FIG. 7 and showing the container portion of the food processor.
Figure 9:
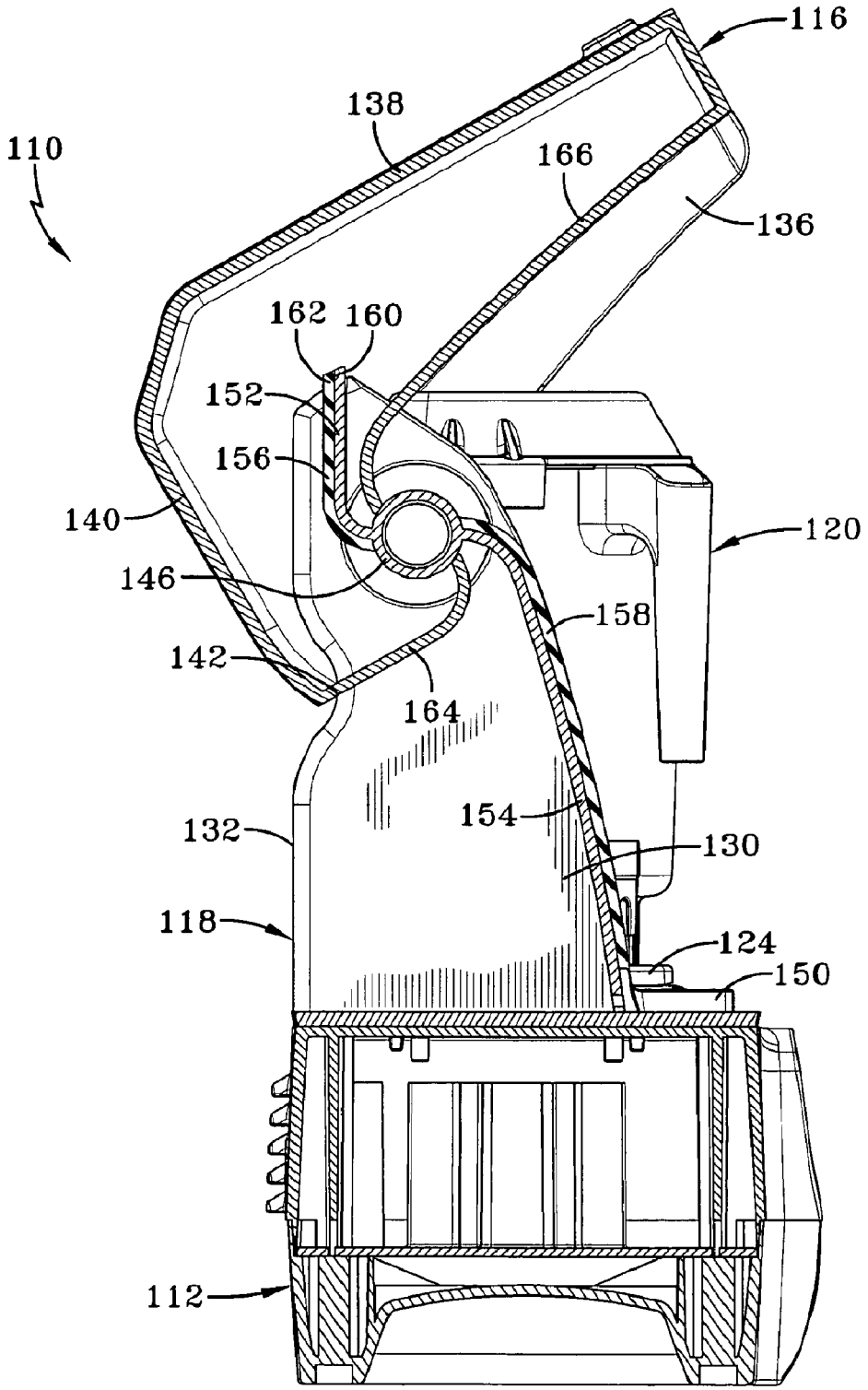
FIG. 9 is a sectional view taken generally across line 9-9 of FIG. 8.

Body portion 118 of enclosure 110 includes opposed side walls 130 spanned by a rear wall 132 and an abbreviated top wall 134. Body portion 118 has an open front area opposed to rear wall 132 (FIG. 8), the front area being closed by cover 116 to form enclosure 110. Cover 116 of enclosure 110 is pivotally secured to body portion 118 such that it can be moved from a closed position to an open position, allowing access to the interior of enclosure 110. Cover 116 includes opposed side walls 136 spanned by a front wall 138, a top wall 140, and an abbreviated back wall 142 (FIGS. 8 and 9). Cover sidewalls 136, front wall 138 and top wall 140 are sized and spaced laterally such that cover 116 may fit over and overlap body portion sidewalls 130.

Cover 116 may be pivotally connected to body portion 118 by any method known in the art, such as, for example, a hinge assembly formed by a pair of sockets 146 on sidewalls 130 of body portion 118 and a pair of corresponding apertures 148 in sidewalls 136 of cover 116. Cover 116 is thus pivotable with respect to body portion 118 on an axis defined by sockets 146.

Body portion 118 also includes a foot 150 at the bottom of sidewalls 130 and rear wall 132, foot 150 being adapted to secure enclosure 110 to the base member 112 of the blender. Foot 150 may be secured to the base member 112 by any method known to those skilled in the art, such as, for example, by tongue and groove attachment, with the use of mechanical fasteners, or with the use of magnets. A vibration dampening seal may optionally be provided between foot 150 and base member 112 to reduce the vibrations that are transferred from the base member to enclosure 110, thereby further reducing the noise created by the blender.

Figure 10:
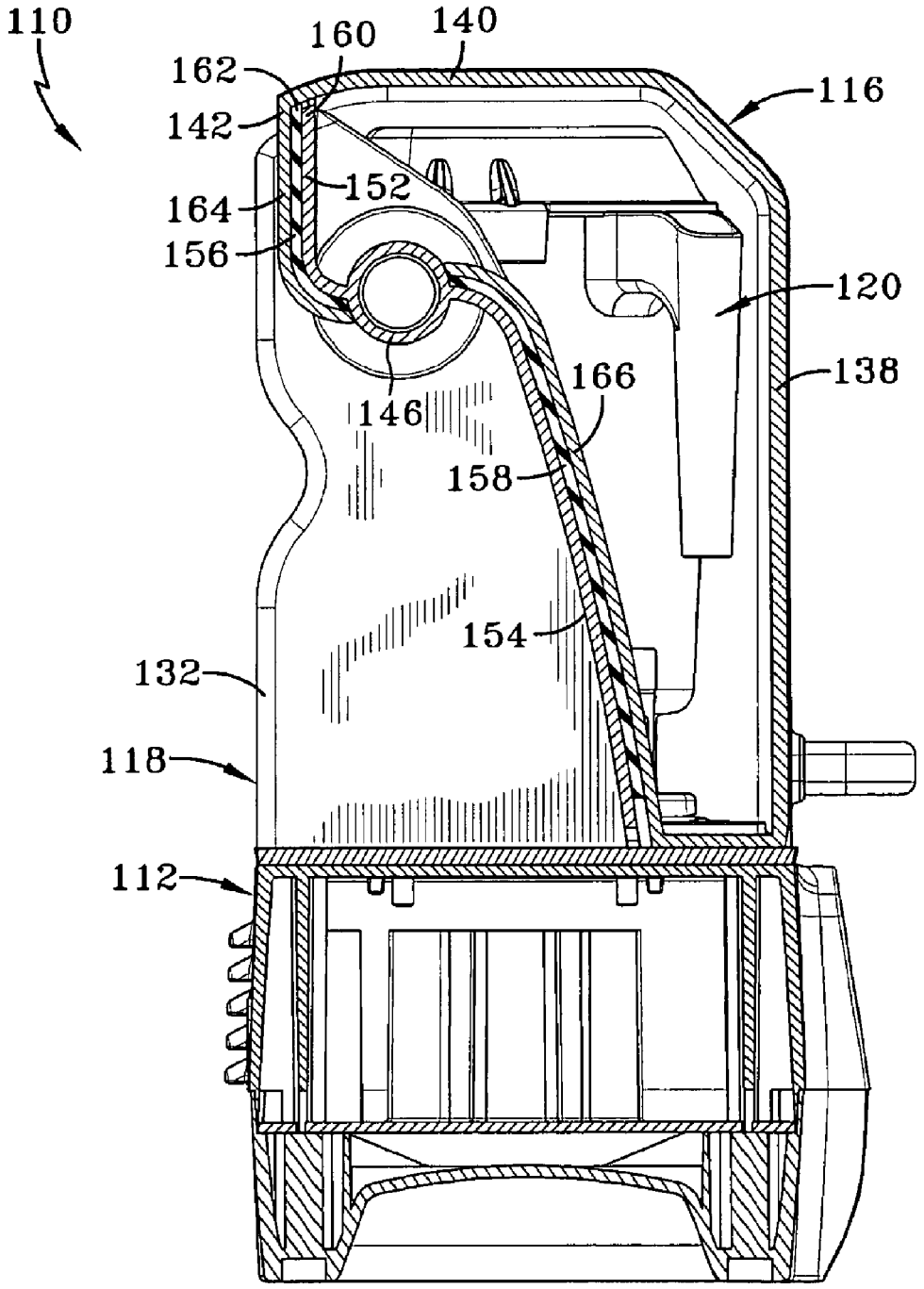
FIG. 10 is a sectional view like FIG. 9 showing the cover in a closed position.

Each sidewall 130 of body portion 118 of enclosure 110 includes a top outwardly projecting sealing flange 152 and a bottom outwardly projecting sealing flange 154, as best shown in FIGS. 9 and 10. Top flange 152 extends from socket 146 to the top of body portion 118, and bottom flange 154 extends from socket 146 to the bottom of body portion 118. Although top flange 152 and bottom flange 154 are shown as generally following the contours of sidewall 130 of body portion 118, with both flanges curving toward socket 146, it will be appreciated by those skilled in the art that top flange 152 and bottom flange 154 may be provided in alternative configurations without deviating from the scope of the present invention. For example, top flange 152 and bottom flange 154 may alternatively be provided as a substantially straight flange extending from the front, bottom corner of sidewall 130 to the top, rear corner of side wall 130, interrupted by socket 146. Top flange 152 and bottom flange 154 extend outwardly at an approximately 90° from sidewalls 130 of body portion 118 only a small distance relative to the overall size of enclosure 110. For instance, top and bottom flanges 152 and 154 may extend outwardly from sidewalls 130 a distance between approximately 0.10 and 0.50 inches.

A top gasket 156 is provided on the surface of top flange 152 facing rear wall 132. A bottom gasket 158 is similarly provided on the surface of bottom flange 154 facing away from rear wall 132. Top gasket 156 and bottom gasket 158 may be made of any material known to persons skilled in the art that is capable of reducing vibrations between cover 116 and body portion 118 and capable of providing a sound reducing seal. For example, gaskets 156 and 158 may be made of a thermoplastic elastomer. Top and bottom flanges 152 and 154 and top and bottom gaskets 156 and 158 are substantially identical on both sidewalls 130. Gaskets 156 and 158 may be secured to flanges 152 and 154, respectively, by any adhesive known to persons skilled in the art.

An upwardly projecting back flange 160 is provided along the edge of abbreviated top wall 134 of body portion 118 between the two top flanges 152 on sidewalls 130. Back flange 160 is similar to top flange 152 and bottom flange 154, and may project upwardly from top wall 134 by a distance of between approximately 0.10 and 0.50 inches. Back flange 160 may also be integral with top flange 152 on both sidewalls 130 so that, in effect, a continuous flange extends from each socket 148, up sidewalls 130, and across abbreviated top wall 134. A back gasket 162 is provided on back flange 160 on the surface facing rear wall 132, the back gasket 162 being the same material as top and bottom gaskets 156 and 158, and being attached to the flange by the same method as the sidewall gaskets.

Sidewalls 136 of cover 116 each have an inwardly projecting upper flange 164 and an inwardly projecting lower flange 166. Upper flange 164 extends from aperture 148 to top wall 140 and lower flange 166 extends from aperture 148 to the bottom of cover sidewall 136. Upper flange 164 and lower flange 166 are substantially identical to top, bottom, and back flanges 152, 154, and 160 of body portion 118, projecting from sidewalls 136 a distance of between approximately 0.10 and 0.50 inches. Upper flange 164 and lower flange 166 on cover 116 also mirror the shape of top flange 152 and bottom flange 154, and are positioned within cover 116 so that upper flanges 164 mate with top gaskets 156, and lower flanges 166 mate with bottom gaskets 158 when cover 116 is in a closed position. At the same time, when cover 116 is closed, back gasket 162 mates with abbreviated back wall 142 of cover 116 to form a back seal. By positioning upper gasket 156 and back gasket 162 on the rear of top flange 152 and back flange 160, a flange may be provided within cover 116 that creates a complete seal above the pivot point of the cover without impeding the ability of the cover to pivot. Similarly, by positioning bottom gasket 158 on the front surface of bottom flange 154, an inner flange may be provided within cover 116 that provides a complete seal without impeding the ability of the cover to pivot.

The inclusion of flanges to support the gaskets of the enclosure is an alternative to adhering gaskets only to the outer surface of sidewall 130 or the inner surface of sidewalls 136. In addition, due to the structure of the flanges and gaskets, the weight of cover 116 acts to maintain a seal between the covers flanges and the gaskets on the body portion of the enclosure when cover 116 is closed.

It is thus evident that an enclosure for a food processor constructed as described herein accomplishes the objects of the present invention and otherwise substantially improves the art.

What is claimed is:

1. An enclosure for a blender comprising a body portion adapted to be secured to a base of the blender, the body portion including opposed sidewalls, a flange extending outwardly from each of said sidewalls, a cover pivotally secured to said body portion and movable between an open position and a closed position, and a gasket positioned between said cover and said flanges on said body portion when said cover is in the closed position.

2. The enclosure of claim 1 said gasket being made of a thermoplastic elastomer material.

3. The enclosure of claim 1, said body portion including a rear wall extending between said sidewalls, a top wall, and a foot adapted to be secured to the base of the blender, said cover including opposing sidewalls, a front wall extending between said cover sidewalls, and a top wall.

4. An enclosure for a blender comprising a body portion adapted to be secured to a base of the blender, a cover pivotally secured to the said body portion and movable between an open position and a closed position, and a sealing gasket, said cover including opposed sidewalls having a rear edge, a front wall extending between said sidewalls, and a top wall, said body portion including opposed sidewalls having outwardly extending flanges shaped to mirror said rear edges of said cover sidewalls, a rear wall extending between said sidewalls, and a top wall, said gasket covering a portion of said sidewalls and said top wall of said body portion and positioned between said body portion and said cover when said cover is in the closed position.

5. The enclosure of claim 4, said gasket having a lip positioned over a front facing surface of said flanges on said body portion sidewalls, wherein said rear edges of said cover are in contact with said lip of said gasket when said cover is in the closed position.

6. The enclosure of claim 5, said cover including a downwardly extending rear flange extending from an edge of said top wall opposite said front wall, said rear flange extending laterally between said cover sidewalls.

7. The enclosure of claim 6, said top wall of said body portion including an upwardly extending top flange, said gasket including a top portion positioned over a rear facing surface of said top flange, wherein said rear flange on said cover is in contact with said top portion of said gasket when said cover is in the closed position.

8. The enclosure of claim 4, said gasket being made of a thermoplastic elastomer.

9. An enclosure for a blender comprising a body portion adapted to be secured to a base of the blender, a cover pivotally secured to [the] said body portion and movable between an open position and a closed position, and a [sealing] gasket *secured to said body portion*, said body portion including opposed sidewalls[,] *and* a rear wall extending between said sidewalls[, and a top wall, said gasket covering a portion of said sidewalls and said top wall of said body portion and positioned between said body portion and said cover when said cover is in the closed position], said gasket [including a bottom portion] extending along *a bottom portion of* said body portion sidewalls and across *a bottom portion of* said rear wall[, said bottom portion being adapted to secure said gasket in position on said body portion].

10. An enclosure for a blender comprising a body portion adapted to be secured to a base of the blender, said body portion including an outwardly extending flange, a cover pivotally secured to said body portion and movable between an open position and a closed position, said cover including an inwardly extending flange, and a gasket positioned on one of said outwardly extending flange and said inwardly extending flange, said gasket being between and in contact with both said outwardly extending flange and said inwardly extending flange when said cover is in the closed position.

11. The enclosure of claim 10, said body portion including opposed sidewalls, a rear wall extending between said sidewalls, and a top wall, said outwardly extending flange extending from said sidewalls and said top wall.

12. The enclosure of claim 11, said cover including opposing sidewalls, a front wall extending between said sidewalls, and a top wall, said inwardly extending flange extending from said cover sidewalls and said cover top wall.

13. The enclosure of claim 12, said cover being pivotally connected to said body portion by a socket extending outwardly from each body portion sidewall, said sockets being received in apertures in each of said cover sidewalls, said sockets and apertures defining a pivot axis of said cover.

14. The enclosure of claim 13, said outwardly extending flange on said body portion being divided into a top flange and a bottom flange by said sockets, said top flange extending upward from said sockets and said bottom flange extending downward from said sockets.

15. The enclosure of claim 14, said inwardly extending flange on said cover being divided into an upper flange and a lower flange by said apertures, said upper flange extending upward from said apertures and said lower flange extending downward from said apertures.

16. The enclosure of claim 15, said gasket being positioned on a front facing surface of said bottom flange and on a rear facing surface of said top flange.

17. The enclosure of claim 10, said gasket being made of a thermoplastic elastomer.

*18. A blender comprising:*

*a base member, said base member housing a motor;*

*an enclosure providing a sound barrier to said base member, the enclosure comprising:*

*a body selectively securable to the base member;*

*a cover coupled to the body, the cover moveable between open and closed positions; and*

*a gasket secured to one of an outer sidewall surface of said body or an inner sidewall surface of said cover, wherein said gasket is configured to prevent said outer sidewall surface of said body from direct contact with said inner sidewall of said cover.*

*19. The blender of claim 18, wherein preventing direct contact of said outer sidewall surface of said body with said inner sidewall of said cover reduces vibration between said body and cover created by said motor.*

*20. The blender of claim 19, wherein at least a portion of said gasket extends along a bottom portion of sidewalls of said body and across a bottom portion of a rear wall of said body.*

* * * * *